United States Patent [19]

Suzuki et al.

[11] Patent Number: 5,514,435
[45] Date of Patent: May 7, 1996

[54] ADHESIVE SHEET

[75] Inventors: Hideaki Suzuki, Nara; Kousuke Hamada, Kashiwa, both of Japan

[73] Assignee: New Oji Paper Co., Ltd., Tokyo, Japan

[21] Appl. No.: 207,160

[22] Filed: Mar. 8, 1994

[30] Foreign Application Priority Data

Mar. 10, 1993 [JP] Japan .................................. 5-048440
Mar. 23, 1993 [JP] Japan .................................. 5-063774

[51] Int. Cl.$^6$ ................................................ B32B 7/12
[52] U.S. Cl. ............................ 428/40; 283/81; 428/204; 428/220; 428/323; 428/327; 428/352; 428/353; 428/354; 428/355; 428/511; 428/520; 428/522; 524/423; 524/558; 524/562
[58] Field of Search ............................ 428/40, 354, 204, 428/220, 323, 327, 352, 353, 511, 520, 518, 522, 355; 283/81; 524/423, 558, 562

[56] References Cited

U.S. PATENT DOCUMENTS 5,064,717 11/1991 Suzuki et al. .......................... 428/354
5,310,578 5/1994 Thum-Muller ........................ 427/220

*Primary Examiner*—Nasser Ahmad
*Attorney, Agent, or Firm*—Larson and Taylor

[57] ABSTRACT

Disclosed is an adhesive sheet comprising a base sheet, an undercoat layer formed on the base sheet, a release agent layer formed on the undercoat layer, an adhesive layer formed on the release agent layer and a face stock disposed on the adhesive layer, wherein the undercoat layer comprises (a) a copolymer obtained by emulsion-copolymerizing at least one hydroxyl group-containing (meth)acrylic ester with at least one of other monomers copolymerizable therewith and (b) a pigment.

12 Claims, 1 Drawing Sheet

ADHESIVE SHEET

FIELD OF THE INVENTION

This invention relates to an adhesive sheet and more particularly to an adhesive sheet free from a tendency toward curl and having good feeding property (i.e., causing no jamming or cockles when the adhesive sheet is subjected to printing or copying with use of a printer or a copying machine), duplication and ink jet recording properties and improved writing and labeling properties.

PRIOR ART

Adhesive sheets are in wide use today in commercial, office and household applications, in such end-use forms as labels, seals, stickers, emblems and so on. The typical architecture of adhesive sheets comprises a face stock, a pressure sensitive adhesive layer and a release liner. The face stock in use includes paper, film and metal foil and the pressure sensitive adhesive includes rubber, acrylic, vinyl ether and other emulsion adhesives, solvent type adhesives and non-solvent type adhesives. The release liner in use includes high-density paper such as glassine paper, clay-coated paper, polyethylene laminated paper, and films of polyethylene terephthalate, polypropylene, etc., each of which is coated with a release agent such as a silicone or fluorine compound.

The adhesive sheet having such a laminated structure tends to curl on account of the moisture-sensitivity of the release liner. The general process for manufacturing an adhesive sheet comprises applying a release agent to a release sheet base material, drying it, applying a pressure sensitive adhesive in super-imposition on the release agent layer, drying the adhesive and laminating it with a face stock.

Since the release sheet base material is thus subjected to two drying steps, following the application of a release agent and of an adhesive agent in its manufacturing process, it is shrunk and therefore rendered highly sensitive to moisture.

Therefore, when the release liner of the adhesive sheet absorbs moisture or water in response to changes in the ambient temperature and humidity, the adhesive sheet undergoes curling almost instantly. Particularly when a highly-beated, high-density base paper such as glassine paper is used as the release sheet base material, it shrinks more markedly than ordinary paper in each drying step and because the free interfiber spaces capable of absorbing the expansion of fibers caused by absorption of moisture or water are very limited, the degree of curl is particularly pronounced.

A curl in the adhesive sheet leads to troubles such as poor feeding, stack lean, handling after printing, etc. in the manufacture of labels, seals or the like by printing, die cutting, sheet cutting, etc. Moreover, in the reproduction of an image on the adhesive sheet using a copying machine, defective feeding, poor duplication and other troubles take place. Therefore, curling of the adhesive sheet is a serious drawback in terms of workability and quality.

As a means for correcting an adhesive sheet in which a curl has been produced, there is a method wherein a curl breaker is used which bends the sheet at an acute angle in the direction opposite to the direction of the curl. For inhibiting the development of a curl, a method has been proposed which comprises maintaining the ambient temperature and humidity at predetermined levels with an air conditioner or by steam damping. However, the manufacturing process is then complicated and the inhibitory effect is not sufficient so that no satisfactory results are obtained.

Furthermore, while the adhesive sheet is slit, guillotined or die-cut according to the intended use, the adhesive agent adheres to the slitter edge, guillotine knife or die in the processing stage. This adhesion of the adhesive agent detracts from the efficiency of the cutting operation. Moreover, if the adhesive on the cutting edge is transferred to the adhesive sheet, the sheet cannot be passed through smoothly in printing the sheet or in labeling process to cause a marked deterioration of operation efficiency.

Meanwhile, the use of an ink jet printer is gaining in popularity for printing or recording on such adhesive sheets. With the increased use of computers in the contemporary information society, the ink jet printer offers the advantage that it provides for high-speed printing with a minimum of noise and that multi-color recording can be easily conducted.

Improvement efforts have so far been made in the aspects of recording machinery and ink composition in order that general commercial paper such as wood-free paper and coated paper may be used as the face stock of the adhesive sheet for ink jet printing, but no satisfactory product has been developed as yet. Moreover, with improvements in the performance of recording hardware such as still higher recording speed and higher resolution image reproduction and an expansion of application such as full-color recording, more sophisticated quality requirements are being imposed on the face stock.

The specific requirements for the face stock of an adhesive sheet compatible with an ink jet printer are: (1) fast absorption of ink takes place with no feathering or soiling, (2) horizontal diffusion of ink dots is not greater than necessary but uniform, (3) ink dots have high density and sharpness, and (4) recorded images are resistant to discoloration or fading during storage due to the influence of light and oxygen in the air.

Several proposals have been made in an attempt to satisfy these performance requirements. By way of illustration, attempts to form an ink-receptive layer composed chiefly of a pigment of good ink absorption characteristic and a binder on a base material have been made since the advent of ink jet recording paper. As the pigment for said ink-receptive layer, silica pigments were proposed in Japanese Unexamined Patent Publication (Kokai) Nos. 9074/1977, 51583/1980, 148583/1981 and 72495/1983 and have been in wide use. Ink-receptive layers each comprising a water-soluble polymer coating have also been proposed in Kokai Nos. 144172/1980 and 146786/1980.

However, when a pigment coating layer is provided, the pigment layer detracts from suitability for affixing seal and writing qualities and gives rise to edge dust. The latter, i.e. the water-soluble polymer layer, is intended for high-density recording and high ink drying speed but because of the emphasis placed on ink jet compatibility by using an extremely low sizing degree for increasing water absorbancy, it has the disadvantage that writing with a water-base ink, for instance, results in feathering, thus failing to reconcile ink jet compatibility with water-base ink writing characteristics.

SUMMARY OF THE INVENTION

An object of this invention is to provide an adhesive sheet having satisfactory workability and property which is substantially free from the problem of curling associated with a release liner not only during manufacture but also in the printing and duplication processes. The invention further provides an adhesive sheet which, in recording with an ink jet printer, shows excellent ink receptivity, gives a sharp and well-defined image record, excellent in the durability of the record and in writing quality, and, in processing stages such as cutting and printing, is improved in the incidence of exfoliation of the label and squeeze-out of the adhesive agent (ooze).

More particularly, this invention provides an adhesive sheet comprising a base sheet, an undercoat layer formed on said base sheet, a release agent layer formed on said undercoat layer, an adhesive layer formed on said release agent layer, and a face stock disposed on said adhesive layer, said undercoat layer comprising (a) a copolymer obtained by emulsion polymerization of at least one hydroxyl group-containing (meth)acrylic acid ester with at least one of other vinyl monomers copolymerizable therewith and (b) a pigment.

DETAILED DESCRIPTION OF THE INVENTION

Figure 1:
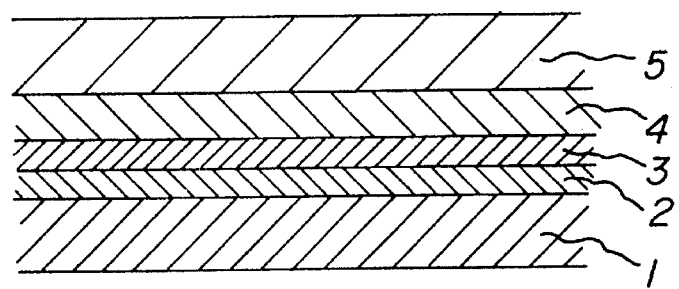
FIG. 1 is a sectional view of the adhesive sheet according to one preferred embodiment of the invention.

As shown in FIG. 1, the adhesive sheet according to a preferred embodiment of this invention comprises a base sheet 1, an undercoat layer 2 formed on said base sheet, a release agent layer 3 formed on said undercoat layer, an adhesive layer 4 formed on said release agent layer and a face stock 5 disposed on said adhesive layer.

The above-mentioned base sheet 1 and undercoat layer 2 constitute a release sheet base material, and this release sheet base material and release agent layer 3 constitute a release liner. The face stock 5 and adhesive layer 4 are detached as a unit from said release liner and used as an adhesive label, seal, sticker, emblem or the like.

Release liner

The release liner of the adhesive sheet according to this invention comprises a base sheet (base paper), an undercoat layer formed by coating an undercoat agent on said base sheet, and a release agent layer formed by coating a release agent on said undercoat layer. The base sheet and the undercoat layer constitute a release sheet base material.

(1) Undercoat layer

The undercoat agent comprises, as a main component, an aqueous copolymer emulsion obtained by emulsion-copolymerizing at least one hydroxyl group-containing (meth) acrylic acid ester with at least one of other vinyl monomers copolymerizable therewith and a pigment.

Examples of the hydroxyl group-containing (meth)acrylic acid esters are those containing 1 or 2 hydroxyl groups within the molecule, and include 2-hydroxyethyl (meth)acrylate, 2-hydroxypropyl (meth)acrylate, 2-hydroxybutyl (meth)acrylate, polyethylene glycol (polymerization degree: about 2–10) mono(meth)acrylate, 2-hydroxy-3-phenoxypropyl (meth)acrylate and glycerol mono(meth)acrylate. At least one of these esters can be employed.

Any of these hydroxyl group-containing (meth)acrylic acid esters contributes to markedly improved adhesion to the release agent such as silicone resin. It is recommended that the proportion of such hydroxyl group-containing (meth)acrylic acid ester based on the total monomers is at least about 0.5 weight % and preferably about 0.5–30 weight %. Particularly when its proportion is about 3–20 weight %, its adhesion to the silicone resin is remarkably increased so that the emulsion can be compatible with both high-temperature-curable and low-temperature-curable silicones. However, the use of the hydroxyl group-containing (meth)acrylic acid ester in excess of 30 weight % should preferably be avoided because the stability of the resultant emulsion tends to be sacrificed.

The vinyl monomers copolymerizable with said hydroxyl group-containing (meth)acrylic acid ester includes, among others, ethylenically unsaturated carboxylic acid such as (meth)acrylic acid, crotonic acid, maleic acid, itaconic acid, fumaric acid, monoalkyl(eg. $C_1$–$C_4$)maleic acid, monoalkyl(eg. $C_1$–$C_4$)fumaric acid, etc., methyl (meth)acrylate, ethyl (meth)acrylate, propyl (meth)acrylate, butyl (meth)acrylate, hexyl (meth)acrylate, octyl (meth)acrylate, 2-ethylhexyl (meth)acrylate, lauryl (meth)acrylate, stearyl (meth)acrylate, vinyl acetate, vinyl chloride, vinylidene chloride, (meth)acrylonitrile, styrene, ethylene, ethylene glycol di(meth)acrylate, diethylene glycol di(meth)acrylate, triethylene glycol di(meth)acrylate, ethylene glycol di(meth)acrylate, polyethylene glycol (polymerization degree: 2–10) di(meth)acrylate, dipropylene glycol di(meth)acrylate, 1,3-butylene glycol di(meth)acrylate, trimethylolpropane tri(meth)acrylate, tetramethylolmethane tetra(meth)acrylate, divinylbenzene, 1,4-butanediol di(meth)acrylate, 1,6-hexanediol di(meth)acrylate, glycidyl (meth)acrylate, methylglycidyl (meth)acrylate, N-methylol(meth)acrylamide, N-methoxymethyl(meth)acrylamide, N-butoxymethyl(meth)acrylamide, N,N'-methylenebis(meth)acrylamide and so on. These monomers can be used alone or in combination.

The proportion of such other copolymerizable monomer or monomers in the copolymer is selected within the range of 70–99.5 weight %.

The preferred aqueous copolymer emulsion is a copolymer emulsion obtained by copolymerizing 3–15 weight % of a hydroxyl group-containing (meth)acrylic acid ester, 2–20 weight % of an ethylenically unsaturated carboxylic acid, 40–80 weight % of a $C_{4-10}$ alkyl ester of (meth)acrylic acid and 2–40 weight % of another monomer such as (meth)acrylonitrile.

The aqueous copolymer emulsion may contain as a crosslinking agent a melamine, epoxide, isocyanate or aziridine compound in an effective amount.

The above aqueous copolymer emulsion can be prepared by the conventional emulsion polymerization method. This polymerization reaction is carried out in an aqueous medium in the presence of 2–6 weight %, based on the total monomer weight, of an emulsifier. When the proportion of the emulsifier is less than 2 weight %, the stability of the resultant emulsion tends to be insufficient and the particle size of the copolymer is increased. On the other hand, if the emulsifier is used in excess of 6 weight %, the adhesion between the undercoat agent and the release agent is often sacrificed.

The emulsifier can be suitably selected from among the compounds conventionally used in the art, and include a variety of anionic surfactants such as potassium oleate, sodium lauryl sulfate, sodium dodecylbenzenesulfonate, sodium alkyl(eg. $C_1$–$C_{10}$)naphthalenesulfonates, sodium dialkyl(eg. $C_1$–$C_{10}$) sulfosuccinates, sodium polyoxyethylene alkyl(eg. $C_1$–$C_{10}$) ether sulfates, sodium polyoxyethylene alkyl (eg. $C_1$–$C_{10}$) allyl ether sulfates, ammonium polyoxyethylene dialkyl (eg. $C_1$–$C_{10}$) sulfates, ammonium polyoxyethylene alkyl (eg. $C_1$–$C_{10}$) phenyl ether sulfates, polyoxyethylene alkyl (eg. $C_1$–$C_{10}$) ether phosphates, polyoxyethylene alkyl allyl ether phosphates, etc., and a variety of non-ionic surfactants such as polyoxyethylene alkyl (eg. $C_1$–$C_{25}$) ethers, polyoxyethylene alkyl (eg. $C_1$–$C_{25}$) aryl ethers, poly(oxyethylene-oxypropylene) block copolymer, polyethylene glycol fatty acid ester, polyoxyethylene sorbitan fatty acid ester, etc. Polymers of comparatively low molecular weight having emulsifying or dispersing activity, such as polyvinyl alcohol and its derivatives, polyacrylamide, polyethylene glycol derivatives, neutralized polycarboxylic acid copolymers, casein, etc., can also be used independently or in combination with the above-mentioned conventional emulsifiers.

The monomer concentration of the polymerization system is generally about 30–70 weight % and preferably about 40–60 weight %. The polymerization initiator which can be used includes but is not limited to persulfates such as ammonium persulfate, azo compounds such as 2,2'-azobisisobutyronitrile, 2,2'-azobis(2,4-dimethylvaleronitrile), etc., peroxides such as hydrogen peroxide, benzoyl peroxide, lauroyl peroxide, etc., redox initiators such as combinations of persulfates with a reducing agent, e.g. sodium sulfite, acid sodium sulfite, etc. The amount of said polymerization initiator is generally about 0.2–2 weight % and preferably about 0.3–1 weight %, relative to the total weight of the monomers to be polymerized. This polymerization reaction is generally conducted at about 60°–100° C. for about 2–8 hours.

The glass transition temperature of the copolymer contained in the thus-produced emulsion is also an important factor in the present invention. Thus, a copolymer having a glass transition temperature in the range of −30° to +20° C., preferably −20° to +10° C., is selectively employed. If the glass transition temperature is below −30° C., the film tackiness will be too great. Conversely if it exceeds 20° C., the resultant film will be too stiff and practically useless.

The glass transition temperature Tg of the copolymer is estimated according to the following general formula.

$$\frac{1}{Tg} = \sum_{i=1}^{n} \frac{Wi}{Tgi}$$

where

Tg: glass transition temperature of copolymer

Tgi: glass transition temperature of homopolymer of the ith monomer

Wi: weight fraction of the ith monomer n: the number of kinds of the monomers to be copolymerized When the copolymer contains carboxyl groups, it is preferably neutralized with a basic substance such as sodium hydroxide, potassium hydroxide, ammonia, or a primary, secondary or tertiary amine, because the stability of the coating will then be enhanced.

It is preferable that the toluene-insoluble gel fraction of the copolymer is at least 55 weight % and more preferably at least 60 weight %. If the gel fraction is less than 55 weight %, the objective effects of the invention will not be obtained. Thus, the release agent on the coating layer will not be allowed to exhibit its inherent potential and, moreover, the release force of an adhesive sheet obtained using such a release liner will undergo aging and become too great.

The toluene-insoluble gel fraction is the value found as follows.

The copolymer is cast into a film between 0.3 and 0.5 mm in dry thickness on a polytetrafluoroethylene sheet. The drying conditions are 50° C. and 24 hours. The film is then cut to 3 cm square and the sample thus obtained is immersed in toluene for 24 hours at 25° C. The sample is then taken out and dried at 105° C. for 3 hours to remove the solvent thoroughly and the gel fraction is calculated from the weights of the sample before and after immersion by means of the following equation.

$$\text{Gel fraction (\%)} = \frac{\text{Weight after immersion (g)}}{\text{Weight before immersion (g)}} \times 100$$

It is also essential that a pigment be incorporated in the undercoat layer. The provision of such a pigment-containing undercoat layer contributes to an inhibition of blocking of the undercoat layer and to a stabilization of a coating composition for forming the undercoat layer. The pigment which can be used for this purpose includes ordinary inorganic and organic pigments such as the oxides, hydroxides, sulfides, carbonates, sulfates or silicates of various metals, e.g. magnesium, calcium, zinc, barium, titanium, aluminum, antimony, lead, etc., and finely-divided powders of solid polymers such as polyethylene, polyvinyl chloride, etc. Particularly, blocking can be efficiently prevented with use of inorganic pigments such as kaolin, talc, silica, gypsum, barium sulfate, alumina white, satin white, titanium dioxide, calcium carbonate or the like.

The undercoat layer is formed by applying to the base sheet a coating composition comprising the above-mentioned aqueous copolymer emulsion and a pigment.

The proportion of the pigment, based on 100 parts by weight of the copolymer, is preferably within the range of about 50–150 parts by weight, preferably about 70–120 parts by weight. If the proportion of the pigment is less than 50 parts by weight, the tackiness of the film will be increased too much, while the use of a pigment in excess of 150 parts by weight will detract from the barrier performance of the film against solvents, thus failing to insure an appropriate release performance. It is preferable that the solids concentration of the coating composition for forming an undercoat layer ranges from about 30 to about 60 weight %.

Furthermore, within the range not contrary to the objects of the invention, the coating composition for forming the undercoat layer may be supplemented with various additives, e.g. a variety of water-soluble natural polymers such as cellulose derivatives (e.g., methylcellulose, ethylcellulose, hydroxyethylcellulose, carboxymethylcellulose, etc.) and starch derivatives (e.g., dextrin, oxidized starch, crosslinked starch, starch esters, graft copolymers of starch, etc.); water-soluble plasticizers such as polyhydric alcohols (e.g., ethylene glycol, glycerin, trimethylolpropane, diethylene glycol, etc.) and polyalkylene glycols (e.g., polyethylene glycol, polypropylene glycol, etc.); crosslinking agents such as urea-formaldehyde resin, melamine-formaldehyde resin, polyamide-polyamine-epichlorohydrin resin, polyacrylamide resin, epoxy resin, etc.; inorganic salts, fillers or loading agents, antifoams, wetting agents, levelling agents, thickeners, film-forming aids and so on.

Coating or impregnating of a base sheet with such an coating composition for forming the undercoat layer can be carried out with a variety of devices such as an air-knife coater, roll coater, gravure coater, bar coater, blade coater, rod-blade coater, size press coater and so on. The coating or impregnating amount of the coating composition is desirably within the range of about 0.1–20 g/m$^2$ preferably about 1–10 g/m$^2$ on a dry weight basis.

(2) Release agent layer

Referring to the release agent to be coated on the undercoat layer thus formed on the base sheet, the conventional silicone compounds and fluorine compounds can be used as such or as diluted with an organic solvent such as toluene, and they can be applied by means of the conventional equipment including the direct gravure coater, bar coater, air-knife coater, offset gravure coater, multi-roll coater and so on.

The preferred release liner has a dynamic coefficient of friction (JIS P8147) of at least 0.2, more preferably about 0.2 to 0.35, as determined between the release layer and a chloroprene rubber surface (Shore A hardness 65°±2°). If the dynamic coefficient of friction is less than 0.2, there can be only a poor preventive effect on the adhesion of the pressure sensitive adhesive to the cutter edge and/or cut faces, resulting in poor feeding on various printers.

As to the coating amount of the release agent, the release agent is applied in a coating amount (coverage) of about 0.05 to 3 g/m$^2$ on a dry weight basis and, then, cured by heating or with ionizing radiation to form a release agent layer.

As specific examples of the release agent that is capable of providing dynamic coefficients of friction within the above-mentioned range, there can be mentioned several release agents available from Dow Corning Toray Silicone Co., Ltd., namely SD-7239, BY24-162, LTC-300B, LTC-350A, LTC-350G, LTC-370G, BY14-403, BY14-405, BY14-407, BY14-413, BY14-414, BY14-411 and BY14-420 and those available from Shin-Etsu Chemical Co., Ltd., namely KS845, KS-770, KNS-202A, KNS-305, KNS-316, KNS-319, KNS-320, X-62-1232 and X-62-1233.

(3) Base sheet

As the base sheet, which in combination with the undercoat layer forms a release sheet base material of the release liner for use in this invention, a variety of fibrous sheets weighing about 30–300 g/m$^2$ and having a thickness of about 30–300 μm can be employed. For example, wood-free paper, mechanical paper, Kraft paper, synthetic paper, nonwoven fabric, films of polyethylene, polypropylene, polyethylene terephthalate, or the like can be mentioned.

The thus-obtained release liner comprising the release sheet base material (i.e., a base sheet+undercoat layer) and release agent layer for use in the adhesive sheet of this invention includes an undercoat layer comprising an emulsion of a copolymer having specified monomer composition and glass transition temperature and a pigment dispersed therein as formed on a base sheet (base paper), and therefore it provides an adhesive sheet having effectively inhibited curling tendency and having excellent feeding and duplication properties.

Face stock

(1) Coating layer

The face stock to be used in the invention is not particularly limited, and any of the conventionally used face stocks wherein a conventional coating layer is formed on a base paper can be used. For example, there can be used a face stock prepared by applying a coating composition containing tapioca starch to a base paper, followed by drying and calendaring.

However, according to a preferred embodiment of the invention, the face stock comprises a base paper and a coating layer formed on the base paper, wherein the base paper is predominantly composed of pulp fiber and wherein the coating layer contains (a) a resin comprising a cationic resin as the main component and (b) a cationic surface size as an auxiliary agent.

The coating layer is formed by applying to the base paper an aqueous coating composition containing said resin and cationic surface size. The coating layer may be formed on one side or both sides of the base paper. When the coating layer is formed on one side of the base paper, it is preferable that the coated side of the base paper is in contact with the adhesive layer.

As regards the coating composition to be coated on the base paper of the face stock for use in this embodiment of the invention, a cationic resin is used as a main ingredient. The cationic resin which can be used includes various synthetic resins such as polyamide-polyamine-epichlorohydrin resin, melamine-formaldehyde resin, polyacrylamide resin, cationized polyvinyl alcohol, cationized starch and so on. These resins are dissolved or dispersed in water and formulated into an aqueous coating solution. The amount of the cationic resin to be used is such that the coating amount thereof is about 0.3 to 6.0 g/m$^2$, preferably 0.5 to 3.5 g/m$^2$ on dry weight basis.

Within the range not contrary to the objects of the invention, water-soluble polymers such as various synthetic polymers, e.g. polyvinyl alcohol, etc., starches such as oxidized starch, etc. and cellulose derivatives such as carboxymethylcellulose, hydroxyethylcellulose, etc. can be used in combination with the above cationic resin. The proportion of such water-soluble polymers may be such that the coating amount thereof is up to about 6 g/m$^2$ preferably about 0.003 to 6.0 g/m$^2$, more preferably about 0.1 to 4.0 g/m$^2$.

The cationic surface size which can be incorporated as an auxiliary agent in this aqueous coating composition includes conventionally used ones, particularly styrene type, styrene-acrylic type and amide type sizes. The level of addition of the cationic surface size is such that the coating amount thereof is about 0.0005 to 0.2 g/m$^2$, preferably about 0.001 to 0.1 g/m$^2$.

The proportions of the cationic resin, water-soluble polymer and cationic surface size in the coating layer are such that per 100 parts by weight of the cationic resin, the water-soluble polymer is used in an amount of about 1 to 2000 parts by weight, preferably about 5 to 200 parts by weight, and the cationic surface size is used in an amount of about 0.01 to 70 parts by weight, preferably about 0.01 to 20 parts by weight.

The above aqueous coating composition can be applied to the base paper surface by means of a two-roll or metering blade type size press, gravure coater, gate roll coater, bill blade coater, short dwell coater or the like. The preferred coating amount is about 0.5–13.0 g/m² for both sides combined on a dry weight basis. If necessary, the coating is levelled with a calender or super-calender.

(2) Base paper

As to the base paper for producing the face stock, a paper stock (stuff) comprising any of chemical pulps of broad-leaved or needle-leaved wood such as KP (Kraft pulp), SP (sulfite pulp), AP (Alkali pulp), etc., mechanical pulps such as SCP (Semi Chemical pulp), BCTMP (bleachedchemithermo mechamnical pulp), CTMP (chemithermo mechnical pulp), CGP (chemigroundwood pulp), RGP (refiner groundwood pulp), SGP (stone groundwood pulp), TMP (thermomechnical pulp), etc. and secondary stock pulps such as DIP (deinked pulp) may be used. If desired, suitable amounts of non-wood pulp, e.g. hemp pulp, synthetic pulp, etc., various synthetic fibers, glass fibers, etc. can be additionally employed.

The paper stock may contain various fillers, e.g. mineral pigments such as talc, kaolin, clay, calcined kaolin, calcium carbonate, aluminum hydroxide, titanium dioxide, magnesium silicate, magnesium sulfate, aluminosilicates, silica, bentonite, etc. and plastic pigments such as finely divided polystyrene and urea-formaldehyde resins, thermoexpansive or non-thermoexpansive microfine hollow particles, etc. The filler can be used in an amount of about 1 to 40 weight %, preferably about 3 to 30 weight % based on the dry weight of the pulp.

As other papermaking additives, there can be employed various conventional sizing agents such as anionic and cationic rosin sizes, petroleum size, alkyl ketene dimer size, alkenyl succinic anhydride size, stearic anhydride size, etc., organic retension aids, drainage aids, and wet-strength or dry-strength resins such as anionic, cationic, nonionic or ampholytic polyacrylamide polymers, polyethyleneimine and its derivatives, polyamides, polyamines and their derivatives, polyethylene oxide, plant gums, polyvinyl alcohol, cationic latices, cationic urea-formaldehyde resin, melamine-formaldehyde resin, polyamide resin, etc. and other organic compounds. Moreover, dyes, pH control agents, pitch control agents, slime control agents, antifoaming agents, etc., can be suitably employed, if so required.

Papermaking from the above paper stock can be carried out under acidic or neutral conditions using a Fourdrinier paper machine, twin-wire machine, tanmo machine, cylinder machine, Yankee machine or the like.

In order to obtain a face stock with good ink jet recording quality in this invention, it is preferable to use a base paper having an initial permeation rate of a 50 weight % aqueous diethylene glycol solution of at least 3.5 g/sec., preferably 3.5 to 8.0 g/sec. If the initial permeation rate is less than 3.5 g/sec., a major part of the coating composition remains on the surface of the base paper after application so that the absorption of ink jet recording ink tends to be adversely affected.

The initial permeation rate, as used in this specification and claims, is the time-dimension value of initial permeation of a given aqueous solution into a recording paper as determined using a dynamic wettability tester (tradename "WET-3000", RHESCA CO., LTD.). Thus, using the above tester in a room maintained at 20° C. and 65% R.H., a sample strip measuring 2 cm wide by 5 cm long is immersed in a longitudinal direction into a 50 wt. % aqueous diethylene glycol solution maintained at 20° C. by 12 mm in depth and the immersion time (sec.) and the weight (g) of the aqueous solution permeated are recorded. The immersion is continued until the permeation weight has substantially reached an equillibrium.

Figure 2:
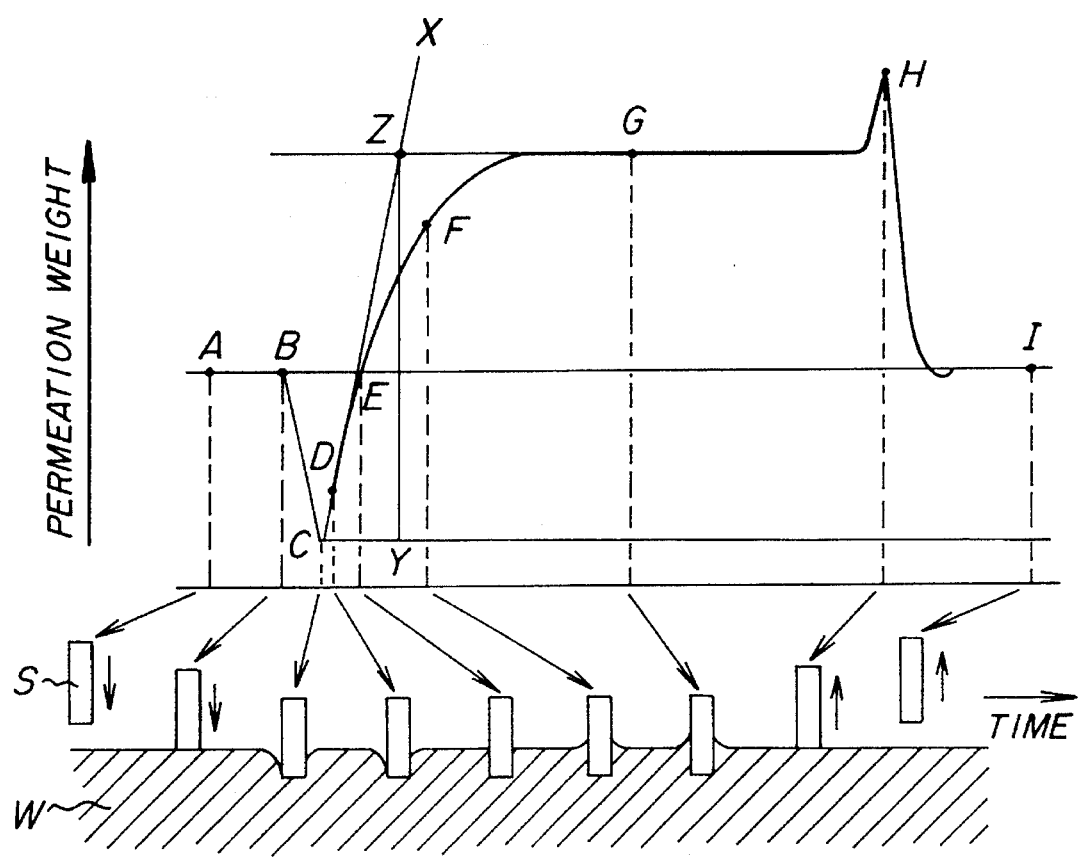
FIG. 2 is a diagrammatic representation of the initial permeation rate of a 50 weight percent aqueous solution of diethylene glycol as defined in this specification; the top graph of FIG. 2 shows the change in the permeation weight of the same aqueous solution of diethylene glycol as plotted against sample immersion time and the bottom graph of FIG. 2 shows the depth of immersion of the sample in the same aqueous solution of diethylene glycol (legends: S stands for a sample and W stands for a 50 wt. % diethylene glycol aqueous solution).

The immersion time (sec) and the permeation weight (g) of the aqueous solution are plotted on graph paper and a tangent line passing through the point of zero second is constructed to find the equillibrium permeation weight and the corresponding immersion time. Then, this equillibrium permeation weight is divided by the immersion time to give the initial permeation rate (g/sec). This procedure is now described in detail referring to FIG. 2. When the sample is immersed in the aqueous solution by 12 mm in depth, the point C is passed. The permeation weight at point C is used as the reference value of permeation and the curve (C, D, E, F, G) after point C represents the change in the permeation weight. The straight line segment from point C is extended (X) and the point of its intersection with the equillibrium level of permeation is designated as point Z. Then, a perpendicular is drawn from point Z to the reference level Y and the value of ZY (g)/CY (sec.) is calculated as the initial permeation rate.

The inventors of this invention found that even if the permeation weight in a given time period is identical, the initial permeation rate varies with different kinds of paper. By measuring this initial permeation rate, the initial permeation of recording paper can be determined with high sensitivity so that both ink jet recordability and water-base ink writing property can be simultaneously evaluated.

It has also been found that among various aqueous solutions, the initial permeation rate value found with 50 wt. % aqueous solution of diethylene glycol shows a very high correlation.

The initial permeation rate of the base paper can be modulated by adjusting papermaking conditions such as pulp composition, beating conditions, formulation amounts of fillers, wet-strength or dry-strength resins, internal size, pH control agent, etc., drying conditions, pressure conditions, etc. according to the paper machine used.

It is preferable that the face stock prepared using a coating composition comprising a cationic resin as the main resin component and a cationic surface size as an auxiliary component according to this invention has an initial permeation rate of 3.0–7.0 g/sec and preferably 3.5–6.5 g/sec, as determined using a 50 weight % aqueous solution of diethylene glycol as mentioned above. When the initial permeation rate of the face stock is less than 3.0 g/sec, a good water-base ink writing quality is assured but the absorption of ink jet recording ink after recording is markedly retarded even if the recording density is high, with the result that the recording part tends to be soiled upon being rubbed. On the other hand, when 7.0 g/sec is exceeded, the absorption of ink jet recording ink is fast enough but the recording density is reduced and, moreover, feathering with water-base ink tends to take place.

Adhesive layer

The adhesive layer of the invention is formed by using a pressure sensitive adhesive conventionally used in the art.

Preferably, the pressure sensitive adhesive is one prepared by copolymerizing in a conventional manner a $C_4$–$C_{20}$ alkyl ester of (meth)acrylic acid with one or more of other monomers selected from $C_1$–$C_3$ alkyl esters of (meth)acrylic acid, vinyl acetate, vinylidene chloride, acrylonitrile, styrene, unsaturated carboxylic acids (e.g., acrylic acid, methacrylic acid, crotonic acid, itaconic acid, etc.), unsaturated carboxylic acid amide (e.g., acrylamide, methacrylamide, N-methylol (meth)acrylamide, N-methoxymethyl (meth)acrylamide, etc.) and hydroxyl group-containing monomers (e.g., hydroxyethyl (meth)acrylate, 2-hydroxypropyl (meth)acrylate, 2-hydroxybutyl (meth)acrylate, etc.). These monomers are selected so that the resulting copolymer will have a glass transition temperature of 203° to 253° K. Generally, based on the total weight of the monomers used, said $C_4$-$C_{20}$ alkyl ester of (meth)acrylic acid is used in an amount of about 50 to 95 weight %, and said other monomer is used in an amount of about 5 to 50 weight %.

The method of copolymerization may be conventional and include solution polymerization, emulsion polymerization, suspension polymerization, bulk polymerization etc., among which emulsion polymerization is preferred from the viewpoints of high molecular weight of the resulting copolymer, high solids concentration of the resulting emulsion and environmental protection. The emulsion polymerization method includes a method wherein whole amount of an emulsifier, an initiator, monomers, water and the like is placed in the polymerization reaction vessel from the beginning and the polymerization is conducted therein, a method wherein an initiator is added in small amounts intermittently to the reaction system, a method wherein water and an emulsifier are placed in the reaction vessel to which an initiator and a monomer mixture containing an unsaturated carboxylic acid monomer are intermittently added, a method wherein a monomer mixture containing an unsaturated carboxylic acid monomer, an emulsifier, water and an initiator are thoroughly mixed together to form a pre-emulsion which is then added to the reaction vessel continuously, etc. The later three methods are generally used in view of the ease of the control of the exothermic reaction during the polymerization procedure.

According to a more preferred embodiment of the invention, polymerization stability and adhesion characteristics are well balanced when the pressure sensitive adhesive is prepared by the following two-stage polymerization process.

Thus, according to this more preferred embodiment, the pressure sensitive adhesive to be used in this invention can be prepared as follows. Thus, a seed polymer emulsion composed predominantly of (meth)acrylic acid ester and having an average particle size of about 0.15–0.35 μm is prepared in a first emulsion-polymerization stage. Then, in a second emulsion polymerization stage, a pre-emulsion comprising a monomer mixture composed mainly of a (meth)acrylate, a tackifier, an emulsifier and water is added to the above emulsion obtained in the first stage, and the second stage polymerization is carried out until the amount of the polymer reaches about 300–3000 parts by weight per 100 parts by weight of the polymer obtained at the end of the first stage emulsion polymerization.

This reaction is now described in further detail.

First, a seed polymer is prepared using at least one ester group-containing monomer selected from a group of (meth)acrylic acid esters as the main monomer unit. This seed polymer preferably has a glass transition temperature (Tg) of −58° to +30° C. If the Tg is less than −58° C., the cohesive force is markedly decreased. Conversely if it exceeds 30° C., the tackiness tends to be decreased. The above seed polymer is preferably prepared by the conventional emulsion polymerization method (e.g. initial charge polymerization, monomer addition polymerization, preemulsion addition polymerization, etc.)

The average particle size of the seed polymer is 0.15–0.35 μm, preferably 0.2–0.3 μm. If the particle size is less than 0.15 μm, the product of the second stage emulsion polymerization will be an emulsion of high viscosity and poor coatability. On the other hand, if the particle size exceeds 0.35 μm, the distribution of the tackifier component in the copolymer will be uneven and the adhesive performance will not be fully improved.

It is preferable that the seed polymer is prepared by polymerizing the monomer at a conversion of at least 98% (residual monomer <2%). With an emulsion of low conversion (rich in monomer), the reaction system may become unstable and the tackifier tends to undergo aggregation to give coarse particles in the second stage emulsion polymerization process.

The preferred seed polymer comprises, as the main component, at least one member selected from the group consisting of (meth)acrylic acid esters, particularly (meth)acrylic acid $C_1$-$C_{20}$ alkyl esters, such as methyl (meth)acrylate, ethyl (meth)acrylate, propyl (meth)acrylate, butyl (meth)acrylate, isobutyl (meth)acrylate, t-butyl (meth)acrylate, cyclohexyl (meth)acrylate, 2-ethylhexyl (meth)acrylate, isononyl (meth)acrylate, lauryl (meth)acrylate, and stearyl (meth)acrylate, and, at least one of other copolymerizable monomers selected from the group consisting of ethylene, vinyl chloride, vinylidene chloride, ethylenically unsaturated carboxylic acids, crosslinking monomers, (α-methyl)styrene, N-alkyl(meth)acrylamides and (meth)acrylonitrile. It is preferable to use about 50 to 95 weight % of the (meth)acrylic acid ester and about 5 to 50 weight % of said other monomer(s), based on the total weight of the monomers used. The ethylenically unsaturated carboxylic acids include, among others, (meth)acrylic acid, crotonic acid, itaconic acid, maleic acid, fumaric acid, monoalkyl(e.g. $C_1$-$C_4$)-maleic acid, monoalkyl(e.g. $C_1$-$C_4$)-fumaric acid, hydroxyethyl monomaleic acid, hydroxypropyl monomaleic acid, etc. The crosslinking monomers include, among others, hydroxyl-containing monomers such as 2-hydroxyethyl (meth)acrylate, 2-hydroxypropyl (meth)acrylate, 3-hydroxyethyl (meth)acrylate, polyethylene glycol (polymerization degree: 2–10) mono(meth)acrylate or polypropylene glycol (polymerization degree: 2–10) mono(meth)acrylate, etc., epoxy group-containing monomers such as glycidyl (meth)acrylate etc., —$CONH_2$ or methylol group-containing monomers such as (meth)acrylamide, diacetoneacrylamide, etc., and monomers containing two or more, preferably 2 to 4, ethylenically unsaturated bonds such as divinylbenzene, divinylsilane, diallyl phthalate, cyclopentadiene, methylenebisacrylamide, diallyl malate, tetraallyloxyethane and so on. For preparing the seed polymer, it is preferable to use about 0.1 to 5 parts by weight of an conventional emulsifier, based on the total monomer weight.

The emulsifier can be suitably selected from among the compounds conventionally used in the art, and include a variety of anionic surfactants such as potassium oleate, sodium lauryl sulfate, sodium dodecylbenzenesulfonate, sodium alkyl(eg. $C_1$-$C_{10}$)naphthalenesulfonates, sodium dialkyl(eg. $C_1$-$C_{10}$) sulfosuccinates, sodium polyoxyethylene alkyl(eg. $C_1$-$C_{10}$) ether sulfates, sodium polyoxyethylene alkyl (eg. $C_1$-$C_{10}$) allyl ether sulfates, ammonium polyoxyethylene dialkyl (eg. $C_1$-$C_{10}$) sulfates, ammonium polyoxyethylene alkyl (eg. $C_1$-$C_{10}$) phenyl ether sulfates, polyoxyethylene alkyl (eg. $C_1$-$C_{10}$) ether phosphates, polyoxyethylene alkyl allyl ether phosphates, etc., and a variety of nonionic surfactants such as polyoxyethylene alkyl (eg. $C_1$-$C_{25}$) ethers, polyoxyethylene alkyl (eg. $C_1$-$C_{25}$) aryl ethers, poly(oxyethylene-oxypropylene) block copolymer, polyethylene glycol fatty acid ester, polyoxyethylene sorbitan fatty acid ester, etc. Polymers of comparatively low molecular weight having emulsifying or dispersing activity, such as polyvinyl alcohol and its derivatives, polyacrylamide, polyethylene glycol derivatives, neutralized polycarboxylic acid copolymers, casein, etc., can also be used independently or in combination with the above-mentioned conventional emulsifiers.

The monomer concentration of the polymerization system is generally about 30–70 weight % and preferably about 40–60 weight %. The polymerization initiator which can be used includes but is not limited to persulfates such as ammonium persulfate, azo compounds such as 2,2'-azobisisobutyronitrile, 2,2'-azobis(2,4-dimethylvaleronitrile), etc., peroxides such as hydrogen peroxide, benzoyl peroxide, lauroyl peroxide, etc., redox initiators such as combinations of persulfates with a reducing agent, e.g. sodium sulfite, acid sodium sulfite, etc. The amount of said polymerization initiator is generally about 0.2–2 weight % and preferably about 0.3–1 weight %, relative to the total weight of the monomers to be polymerized. This polymerization reaction is generally conducted at about 60°–100° C. for about 2–8 hours.

The adhesive for use in this invention is a copolymer which is obtained by conducting, in the presence of the copolymer obtained in the first stage emulsion polymerization described above, second-stage emulsion polymerization as follows. In this second stage, an emulsified monomer mixture comprising, as the main component, one or more $C_4$–$C_{20}$ alkyl (meth)acrylates, and at least one functional group-containing monomer selected from the group consisting of ethylenically unsaturated carboxylic acids and crosslinking monomers, at least one nonionic monomer selected from the group consisting of vinyl esters (e.g., vinyl acetate, vinyl propionate, vinyl versatate derivatives available under the tradename "Veova 10" from Shell Chemical Co., Ltd., etc.), (meth)acrylic acid $C_1$–$C_3$ alkyl esters, (α-methyl)styrene and benzyl (meth)acrylate and a tackifier is added to the above seed polymer emulsion obtained in the first stage and the emulsion polymerization is further conducted in the presence of a conventional emulsifier and a conventional initiator. The emulsifier and initiator to be used may be those exemplified above with respect to the first stage emulsion polymerization. Other reaction conditions such as the amount of emulsifier, amount of initiator, monomer concentration, reaction temperature and reaction time may be substantially the same as those of the first stage emulsion polymerization, although the reaction temperature is preferably about 70° C. and the manner of addition of the initiator, monomers, etc. may be suitably varied, if so desired.

As the ethylenically unsaturated carboxylic acids and crosslinking monomers, those exemplified with respect to the first stage may be used.

There is not a specific restriction on the monomer composition in the above emulsified monomer mixture, but it is generally preferable to use the $C_4$–$C_{20}$ alkyl (meth)acrylates, functional group-containing monomer and nonionic monomer in the proportions such that the resulting copolymer will have a glass transition temperature of about −60° C. to about −40° C. Typically, the monomer composition (relative to the total weight of the monomers used) may be as follows.

| Monomer | Proportion (wt. %) |
| --- | --- |
| $C_4$–$C_{20}$ alkyl (meth)acrylates | 50–95 |
| functional group-containing monomer | 0.1–10 |
| nonionic monomer | 10–60 |

The tackifier which can be used in this invention includes the tackifiers conventionally used in the art, thus including but being not limited to rosins such as green rosin, hydrogenated rosin, hydrogenated rosin ester, disproportionated rosin ester, polymerized rosin ester, etc., polyterpene resins such as α-pinene resin, β-pinene resin, dipentene resin, terpene-phenol resin, etc., aliphatic petroleum resins such as Hi-rez (Mitsui Petrochemical Industries, Ltd), Quintone (Nippon Zeon Co., Ltd), Tackirol (Sumitomo Chemical Co., Ltd), Escorez 1000 (EXXON CHEMICAL CO., LTD.), etc., aromatic petroleum resins such as Neopolymer S (Nippon Synthetic Resin Co., Ltd.), Petorosin (Mitsui Petrochemical Industries, Ltd.), etc., pure monomer copolymerized petroleum resins such as Hiresin (Toho Chemical Industries, Ltd.), Escorez 200 (EXXON CHEMICAL CO,. Ltd), etc., alicyclic petroleum resins such as Arkon (Arakawa Chemical Industries, Ltd.), Escorez (8000 EXXON CHEMICAL CO., Ltd.), etc., polyamide resins such as Tohmide (Fuji Chemical Industry Co,. Ltd.) etc., epoxy resins such as Epycote (Yuka-Shell Epoxy Co., Ltd.), EPOMIC (Mitsui Petrochemical Industries Co., Ltd.), EPOTOHTO (Tohto Kasei Co., Ltd.), etc.; and elastomers such as natural rubber, isoprene rubber, styrene-butadiene rubber, styrene-butadiene block copolymer, styrene-isoprene block copolymer, ethylene-isoprene-styrene block copolymer and so on. The tackifier is preferably used in an amount of about 5 to 80 weight parts, more preferably about 10 to 50 weight parts, per 100 weight parts of the second stage polymer emulsion (dry weight).

The adhesive for use in this invention comprises the first stage seed polymer and 300–3,000 parts by weight of the second-stage polymer per 100 parts by weight of the first-stage seed polymer. If the proportion of the second-stage polymer is less than 300 parts by weight, the bond strength will not be sufficiently improved. On the other hand, if it exceeds 3,000 parts by weight, the stability of emulsion polymerization and the stability of the product emulsion are adversely affected.

In the present invention, the above-mentioned adhesives, i.e., copolymer emulsions according to the preferred embodiment and the more preferred embodiment may be neutralized by an aqueous alkaline solution such as aqueous ammonia solution, if so desired, and then the viscosity of the emulsion is adjusted to about 3000 to 6000 cps by adding a conventional thickener, if so desired.

In any event the pressure sensitive adhesive in the adhesive layer preferably has a tensile strength (JIS K6301) of 0.5–2.0 kg/cm$^2$ and an elongation (JIS K6301) of 1,500–3,000%. The adhesive sheet fabricated using such a pressure sensitive adhesive is advantageous in that the adhesion of the adhesive to the cutter knife and the cut face (ooze) is further reduced.

There is no particular limitation on the manner of fabrication of an adhesive sheet. Thus, using a conventional device such as the reverse coater, knife coater, slot die coater, lip coater and so on, the adhesive is applied to the release agent layer of the release liner and, if desired, dried to form an adhesive layer, and a face stock is then laminated. The laminate is finished by after-treatment such as moisture conditioning. The coating amount of the adhesive is preferably within the range of about 5–50 g/m² on a dry basis. If the coating amount is less than 5 g/m² the resulting adhesive sheet will not have a sufficient bond strength with respect to various adherends. On the other hand, if the coating amount exceeds 50 g/m² the adhesive will ooze out during laminating process and a cohesive failure may occur in peeling.

Thanks to the above unique combination of a face stock and a release liner, the adhesive sheet of this invention is resistant to curling, has excellent ink receptibility and writing quality and is free from troubles such as exfoliation of the label and oozing of the adhesive.

EXAMPLES

The following examples are intended to describe this invention in further detail and should by no means be construed as defining the scope of the invention. In these examples, all parts and % are by weight unless otherwise indicated.

Example 1

Face stock

To a pulp slurry composed of 30 parts of NBKP and 70 parts of LBKP and having a Canadian standard freeness (hereinafter "freeness") value of 540 ml were added 5 parts of talc, 1.3 parts of rosin emulsion and 2 parts of aluminum sulfate and the composition was formed into a paper web on a Fourdrinier machine to provide a base paper weighing 64 g/m².

Using a size press coater, this base paper was coated with a 6.5% solution of tapioca starch in a coating amount of 40 g/m² and the coated paper was dried and machine-calendered to provide a face stock with a paper moisture content of 6.0%.

Release liner

An emulsified monomer mixture (A) was prepared using 20 g of 2-hydroxyethyl methacrylate, 240 g of butyl acrylate, 40 g of acrylonitrile, 20 g of acrylic acid, 68 g of methyl methacrylate, 12 g of N-methylolacrylamide, 10 g of alkyl phenyl ether sulfate emulsifier (Sanyo Chemical Industries, Ltd., trademark "Eleminol ES-70") and 170 g of deionized water.

A 2-liter four-necked flask fitted with a stirrer, condensor, dropping funnel, nitrogen inlet tubing and thermometer was charged with 240 g of deionized water, 2 g of the same emulsifier as above and 0.8 g of potassium persulfate, and the charge was heated to 70° C. with the passage of nitrogen gas. Then, 1/6 of the above-prepared emulsified monomer mixture (A) was added dropwise. When the conversion reached 90%, the balance of the emulsified monomer mixture (A) was added dropwise over a period of 2 hours for polymerization. After completion of dropwise addition, the reaction mixture was subjected to aging at 70° C. for 2 hours to complete the reaction. The contents of the flask were then cooled to 40° C. and neutralized with aqueous sodium hydroxide solution. After this neutralization reaction, the contents were vigorously stirred to provide an aqueous copolymer dispersion (i) for use in this invention. The glass transition temperature of the resulting copolymer was 4° C. The amount of the emulsifier was 3.0% relative to the total amount of the monomers used for preparing the copolymer (i).

A coating composition for forming an undercoat layer (solids concentration: 45%) was prepared using 100 parts (calculated as solids) of the aqueous copolymer dispersion (i), 100 parts of ultra-fine ground limestone (Bihokufunka Kogyo Co., Ltd., tradename "Hydro Carb K"), 1 part of lubricant (San Nopco Limited, tradename "Nopcote C-104") and 0.6 part of defoaming agent (Sun Nopco Limited, tradename "Nopco 1407K"). Then, using a rod-blade coater, a wood-free paper weighing 49 g/m² and having a thickness of 65 µm was coated with the above coating composition in a dried coating amount of 5 g/m² and dried to provide a release sheet base material.

Then, using a bar coater, this release sheet base material is further coated, on the undercoat layer thereof, with a 9% toluene solution of silicone release agent (Shin-Etsu Chemical Co., Ltd., tradename "KS-845", dynamic coefficient of friction 0.27) in a dried coating amount of 1.0 g/m² and dried to provide a release liner.

Adhesive agent

A preemulsion was prepared by adding a monomer mixture of 85 parts of 2-ethylhexyl acrylate, 14.5 parts of methyl methacrylate and 0.5 part of acrylic acid to an aqueous solution containing 1 part of polyoxyethylene alkyl phenyl ether sulfate sodium salt (Kao Corporation, tradename "Levenol WZ"), 0.2 part of sodium dodecylbenzenesulfonate, 1 part of polyoxyethylene nonyl phenyl ether (Kao Corporation, tradename "Emulgen 906, HLB=10.8) and 0.3 part of sodium acetate in 30 parts of deionized water and stirring the whole mixture well.

A reactor equipped with a stirrer, thermometer and condenser was charged with an aqueous emulsifier solution containing 0.2 part of sodium dodecylbenzenesulfonate, 1 part of polyoxyethylene nonyl phenyl ether (Kao Corporation, tradename "Emulgen 906, HLB=10.8), 0.3 part of sodium acetate in 30 parts of deionized water, and the charge was heated to 75° C. under nitrogen gas with stirring. Then, 5/100 of the above preemulsion was added and the prepolymerization reaction was carried out for 30 minutes. The balance of the preemulsion was then added dropwise over a period of 4 hours and the polymerization reaction was carried out at a constant temperature of 75°–80° C.

After completion of dropwise addition, the post-polymerization was further carried out at 80° C. to provide a copolymer emulsion. This copolymer emulsion had a solids content of 50%, a viscosity of 200 cps, a pH value of 3.0 and an average particle size of 0.3 µm. The glass transition temperature of the copolymer was –49° C.

This copolymer emulsion was neutralized with 25% aqueous ammonia and a thickener (Kao Corporation, tradename "Vissurf 1400") was added so as to adjust its viscosity to 4500 cps. and thereby provide a pressure sensitive adhesive.

Adhesive sheet

Using a reverse roll coater, the release liner prepared above was coated, on the release agent layer thereof, with the above adhesive (tensile strength 1.2 kg/cm² elongation 1,800%, each according to JIS K 6301; the same applies hereinafter) in a dried coating amount of 17 g/m² and dried. The face stock described above was then laid on this adhesive layer and press-rolled to provide an adhesive sheet.

Example 2

Face stock

To a pulp slurry composed of 20 parts of NBKP and 80 parts of LBKP and having a freeness value of 500 ml were added 5 parts of talc, 0.2 part of rosin emulsion and 2 parts of aluminum sulfate to provide a paper stock. This stock was formed into a web on a Fourdrinier machine to provide a base paper weighing 64 g/m².

Using a size press coater, this base paper was coated with an aqueous coating composition (solids content: 3%) comprising 2.95 weight % of a 4:1 mixture of polyamide-epichlorohydrin resin (tradename "WS-570", JAPAN PMC CORPORATION), as a main component cationic resin, and oxidized starch (tradename "Ace-A", Oji Cornstarch Co., Ltd.) and 0.05 weight % of a cationic amide type surface size (styrene-acrylamide type, tradename "CS-220R", JAPAN PMC CORPORATION) in a coating amount of 40 g/m². The coated paper was dried and machine-calendered to provide a face stock with a paper moisture content of 6.5%.

Release liner

The release liner was prepared in the same manner as in Example 1.

Adhesive agent

A seed emulsion was first prepared by adding a monomer mixture of 30 parts of vinyl acetate, 68 parts of 2-ethylhexyl acrylate, 2 parts of acrylic acid and 0.3 part of N-methylolacrylamide to an aqueous emulsifier solution containing 1 part of polyoxyethylene alkyl phenyl ether sulfate sodium salt (Kao Corporation, tradename "Levenol WZ"), 0.2 part of sodium dodecylbenzenesulfonate, 1 part of polyoxyethylene nonyl phenyl ether (Kao Corporation, tradename "Emulgen 920", HLB=15.5), 0.3 part of sodium acetate in 30 parts of deionized water and stirring the whole mixture well to provide a preemulsion.

A reactor equipped with a stirrer, thermometer and condenser was charged with an aqueous emulsifier solution containing 0.2 part of sodium dodecylbenzene-sulfonate, 1-part of polyoxyethylene nonyl phenyl ether (Kao Corporation, tradename "Emulgen 920, HLB=15.5) and 0.3 part of sodium acetate in 30 parts of deionized water, and the temperature of the charge was increased to 75° C. with the introduction of nitrogen gas and stirring. Then, 5/100 of the above preemulsion was added and the pre-polymerization reaction was carried out for 30 minutes. Then, the balance of the preemulsion was added dropwise over a period of 4 hours and the polymerization reaction was conducted at a constant temperature of 75°–80° C.

After completion of dropwise addition, the post-polymerization was further carried out at a constant temperature of 80° C. to provide a copolymer emulsion. This copolymer emulsion (i.e., seed polymer emulsion) had a solids content of 50%, a viscosity value of 100 cps, a pH value of 3.0 and an average particle size of 0.23 μm. The glass transition temperature of this copolymer was −44° C.

Then, a tackifier resin-containing emulsion was prepared as follows.

A mixture of 30 parts of methyl acrylate, 58 parts of 2-ethylhexyl acrylate, 2 parts of acrylic acid and 10 parts of a tackifier (hydrogenated rosin ester, Arakawa Chemical Industries, Ltd., tradename "Super Ester A-100") was added to an aqueous emulsifier solution containing 1 part of polyoxyethylene alkyl phenyl ether sulfate sodium salt (Kao Corporation, tradename "Levenol WZ"), 0.3 part of sodium dodecylbenzenesulfonate, 1 part of polyoxyethylene nonyl phenyl ether (Kao Corporation, tradename "Emulgen 930", HLB=15.1) and 0.4 part of sodium acetate in 30 parts of deionized water and the whole mixture was stirred well to provide a preemulsion.

A reactor equipped with a stirrer, thermometer and condenser was charged with 20 parts of the above seed polymer emulsion and 18 parts of deionized water and the temperature of the charge was increased to 75° C. with the passage of nitrogen gas and stirring. At this temperature, 132.7 parts of the above preemulsion, 0.3 part of potassium persulfate and 7 parts of deionized water were added dropwise over a period of 4 hours to conduct a polymerization reaction. The resultant copolymer emulsion had a solids content of 65%, a viscosity value of 400 cps, a pH value of 3.5 and an average particle size of 0.45 μm. The glass transition temperature of the copolymer was −45° C.

The above copolymer emulsion was neutralized with 25% aqueous ammonia, and a thickener (Kao Corporation, tradename "Vissurf 1400") was added so as to adjust its viscosity to 5000 cps.

Adhesive sheet

Using a reverse roll coater, the release liner obtained above was coated, on the release agent layer thereof, with the above adhesive (tensile strength 2.0 kg/cm², elongation 1,500%) in a dried coating amount of 17 g/m², followed by drying Then, using a press roll, the face stock described above was laminated onto the adhesive layer to provide an adhesive sheet.

Example 3

A face stock was prepared in the same manner as in Example 2.

A release sheet base material was prepared by the procedure described in Example 1 except that an emulsion of a copolymer of 60 weight % of butyl acrylate, 10 weight % of 2-hydroxyethyl acrylate, 25 weight % of methyl methacrylate and 5 weight % of acrylic acid (tradename "Rikabond ET-84", Chuo Rika Kogyo Corporation; Tg, −11° C.) was used in lieu of the aqueous copolymer dispersion (i) and that the dried coating amount of the undercoat agent was 4.5 g/m². Then, a release liner was fabricated in the same manner as in Example 1 except that LTC®-350A (Dow Corning Toray Silicone Co., Ltd., dynamic coefficient of friction: 0.21) was used as the silicone release agent in a dried coating amount of 1.1 g/m².

Using the above release liner, the same adhesive agent and coating procedure as used in Example 2 were followed to provide an adhesive sheet.

Example 4

The same base paper for the face stock as used in Example 2 was used. Using a size press coater, this base paper was coated with an aqueous coating composition (solids content: 4%) comprising 3.97 weight % of a 4:2 mixture of a cationic polyamide resin (as the cationic resin, tradename "Polystron 619", Arakawa Chemical Industries, Ltd.) and polyvinyl alcohol (tradename "PVA 205", Kuraray Co., Ltd.) and 0.03 weight % of a cationic styrenic surface size (tradename "Polymaron 360", Arakawa Chemical Industries, Ltd.) in a coating amount of 35 g/m² on wet basis. The coated paper was dried and machine-calendered to provide a face stock with a paper moisture content of 6.5%.

Using the above face stock and the same release liner, adhesive agent and coating procedure as used in Example 2, an adhesive sheet was fabricated.

Example 5

Face stock

To a pulp slurry composed of 10 parts of NBKP with a freeness value of 520 ml and 90 parts of LBKP with a freeness value of 500 ml were added 8 parts of calcium carbonate and 0.2 part of alkyl ketene dimeter size and the resulting paper stock was formed into a paper web on a Fourdrinier machine to provide a base paper weighing 64 g/m².

Using a size press coater, this base paper was coated with an aqueous coating composition (solids content: 4%) comprising 3.94 weight % of a 4:1 mixture of a cationic polyamide resin (a cationic resin, tradename "P-9130", JAPAN PMC CORPORATION) and polyvinyl alcohol and 0.06 weight % of a styrene-acrylic surface size (tradename "Polymaron 360" Arakawa Chemical Industries, Ltd.) in a coating amount of 40 g/m², and the coated paper was dried and machine-calendered to provide a face stock with a paper moisture content of 6.5%.

Release liner

The release sheet base material was prepared in the same manner as in Example 3.

Then, a release liner was prepared following the procedure of Example 1 and using LTC-300B (Dow Corning Toray Silicone Co., Ltd., dynamic coefficient of friction 0.21) as the silicone release agent in a dried coating amount of 1.0 g/m².

Adhesive sheet

Using a slot die coater, the release agent layer of the above release liner was coated with an acrylic adhesive (Duro-Tak®AQ-432T, Kanebo-NSC, Ltd., tensile strength 1.5 kg/cm², elongation 2.500%) in a dried coating amount of 14 g/m² and dried. Then, the above face stock was laid on this adhesive coating layer and press-rolled to provide an adhesive sheet.

Example 6

Face stock

A face stock Was prepared by the procedure described in Example 2 except that the polyamide-epichlorohydrin resin (a cationic resin) and the oxidized starch were used in a ratio of 4:2.

Release liner

The same release sheet base material as used in Example 3 was provided. Then, a release liner was fabricated in the same manner as in Example 3 with the exception of using SD®-7239 (a silicone release agent, Dow Corning Toray Silicone Co., Ltd., dynamic coefficient of friction 0.25) in a dried coating amount of 1.0 g/m².

Adhesive sheet

An adhesive (tensile strength 1.8 kg/cm², elongation 2,500%) was prepared in the same manner as in Example 2 with the exception of using a polyterpene resin (tradename "YS® Resin TO-105", Yasuhara Fats & Oils Co., Ltd.) as the tackifying resin. Using a reverse roll coater, the above release liner was coated with this adhesive in a dried coating amount of 15 g/m², followed by drying. The face stock described above was laid on this adhesive layer and press-rolled to provide an adhesive sheet.

Example 7

Face stock

Using a size press coater, the same base paper as that used in Example 5 was coated with an aqueous coating composition (solids content: 4%) comprising 3.93 weight % of a 4:2 mixture of cationic polyamide resin (a cationic resin) and the polyvinyl alcohol and 0.07 weight of the styrene-acrylic surface size in a coating amount of 40 g/m² and the coated paper was dried in the same manner as in Example 5.

Release liner

The same release sheet base material as that used in Example 3 was provided, and a release liner was produced in the same manner as in Example 3 except that LTC-350 A (tradename, Dow Corning Toray Silicone Co., dynamic coefficient of friction 0.21) was used as the silicone release agent in a dried coating amount of 1.0 g/m².

Adhesive sheet

Using a slot die coater, the release agent layer of the above release liner was coated with an acrylic adhesive (tradename "Duro-Tak AQ-432T", Kanebo-NSC, tensile strength 1.5 kg/cm², elongation 2,500%) in a dried coating amount of 14 g/m² and dried. The face stock described above was then laid on this adhesive layer and press-rolled to give an-adhesive sheet.

Example 8

Release liner

The procedure of Example 1 was repeated except that the ultra-fine ground limestone was used in an amount of 130 parts to prepare an undercoat coating composition of 50% concentration. The same base sheet (wood-free paper) as used in Example 1 was then coated with the above coating composition in the same manner as in Example 1, and then a release liner was produced following the procedure of Example 1.

Adhesive sheet

Using the thus-obtained release liner and the same adhesive agent and face stock as described in Example 1, an adhesive sheet was fabricated in otherwise the same manner as Example 1.

Example 9

Release liner

An undercoat coating composition of 40% concentration was prepared in the same manner as in Example 2 except that ultra-fine ground limestone, lubricant and defoaming agent were used in amounts of 60 parts, 3 parts and 0.8 part, respectively. Then, the same base sheet as used in Example 2 was coated with the above coating composition in the same manner as in Example 2, and then a release liner was produced following the procedure of Example 2.

Adhesive sheet

Using the above release liner and the same adhesive agent and surface stock as used in Example 2, an adhesive sheet was fabricated in otherwise the same manner as Example 2.

Example 10

Release liner

An undercoat coating composition was prepared in the same manner as in Example 2 except that calcined kaolin was used in lieu of ultra-fine ground limestone. Then, the same base sheet as used in Example 2 was coated with the above coating composition in the same manner as in Example 2, and then a release liner was produced following the procedure of Example 2.

Adhesive sheet

Using the thus-obtained release liner and the same adhesive agent and face stock as used in Example 4, an adhesive sheet was fabricated as in Example 4.

Example 11

Release liner

An emulsified monomer mixture (B) was prepared using 40 g of 2-hydroxypropyl methacrylate, 190 g of butyl acrylate, 60 g of acrylonitrile, 30 g of acrylic acid, 16 g of polyoxyethylene lauryl ether sulfate sodium emulsifier (tradename "Latemul E-150", Kao Corporation) and 170 g of deionized water.

Except that the above emulsified monomer mixture was used, the polymerization reaction was carried out in the same manner as in Example 1 and the reaction mixture was subjected to aging at 70° C. for 2 hours to complete the reaction. After aging, the contents of the flask were cooled to 40° C., neutralized with aqueous potassium hydroxide solution and stirred vigorously to provide an aqueous copolymer emulsion. The glass transition temperature of this copolymer was 16° C. and the emulsifier content was 4.5%.

Adhesive sheet

The procedure described in Example 1 was repeated except that the above aqueous copolymer emulsion was used to provide a release liner. Using this release liner and the same adhesive and face stock as used in Example 4, an adhesive sheet was fabricated in otherwise the same manner as Example 4.

Example 12

Release liner

An emulsified monomer mixture (C) was prepared using 10 g of 2-hydroxyethyl methacrylate, 300 g of butyl acrylate, 20 g of acrylonitrile, 10 g of acrylic acid, 48 g of methyl methacrylate, 12 g of N-methylolacrylamide, 10 g of alkyl phenyl ether sulfate emulsifier (tradename "Eleminol ES-70", Sanyo Chemical Industries, Ltd.) and 170 g of deionized water.

Then, except that the above emulsified monomer mixture (C) was used, the polymerization reaction was carried out in the same manner as in Example 1 and the reaction mixture was aged at 70° C. for 2 hours to complete the reaction. After aging and cooling to 40° C., the reaction system was neutralized with aqueous potassium hydroxide solution and, then, stirred vigorously to provide an aqueous copolymer dispersion. The glass transition temperature of this copolymer was −21° C. The amount of the emulsifier was 3.0% relative to the total amount of the monomers used for preparing the copolymer.

Adhesive sheet

A release liner was prepared in the same manner as in Example 1 except that the above aqueous copolymer dispersion was used. Then, using this release liner and the same adhesive and face stock as used in Example 4, an adhesive sheet was fabricated in the same manner as Example 4.

Comparison Example 1

Release liner

An emulsified monomer mixture (D) was prepared using 270 g of butyl acrylate, 16 g of acrylic acid, 48 g of acrylonitrile, 10 g of polyoxyethylene nonyl phenyl ether sulfate sodium emulsifier (tradename "Latemul E975", mol. wt.=3622, Kao Corporation) and 170 g of deionized water.

A 2-liter four-necked flask fitted with a stirrer, condenser, dropping funnel, nitrogen inlet tubing and thermometer was charged with 240 g of deionized water, 2 g of the same emulsifier as above and 0.8 g of potassium persulfate and the charge was heated to 70° C. under nitrogen gas. Then, 1/6 of the above emulsified monomer mixture (D) was added dropwise. When the conversion reached 90%, the remainder of the monomer mixture (D) was added dropwise over a period of 2 hours for polymerization. After completion of dropwise addition, the reaction system was aged at 70° C. for 2 hours to complete the reaction.

After aging, the contents of the flask were cooled to 40° C. and neutralized with aqueous sodium hydroxide solution. After this reaction, the system was vigorously stirred to provide an aqueous copolymer dispersion (D). The glass transition temperature of this copolymer was −21° C. The emulsifier content was 3.0% relative to the amount of the monomers used for preparing the copolymer (D).

Separately, an emulsified monomer mixture (E) was prepared using 80 g of butyl acrylate, 8 g of acrylic acid, 240 g of acrylonitrile, 72 g of methyl methacrylate, 12 g of N-methylolacrylamide, 10 g of polyoxyethylene nonyl phenyl ether sulfate sodium emulsifier (tradename "Latemul E-975", mol. wt. 3622, Kao Corporation) and 170 g of deionized water.

Except that the above emulsified monomer-mixture (E) was used, the polymerization reaction was carried out and the reaction mixture was aged at 70° C. for 2 hours to complete the reaction just as described above. After aging, the contents of the flask were cooled to 40° C. and neutralized with aqueous potassium hydroxide solution. After this reaction, the system was stirred vigorously to provide an aqueous copolymer dispersion (E). The glass transition temperature of this copolymer was 56° C. and the emulsifier content was 3.0% relative to the total amount of the monomers used for preparing the copolymer (E).

An undercoat coating composition of 35% concentration with a viscosity of 400 cps was prepared using 100 parts (calculated as solids) of aqueous copolymer dispersion (D), 20 parts (calculated as solids) of aqueous copolymer (E), 1 part of colloidal silica (tradename "Snowtex 30", Nissan Chemical Industries, Ltd.) and 1 part of glycerin, and a release sheet-base material was prepared by coating a wood-free paper, 40 g/m² and 55 μm thick, with the above coating composition using a rod blade coater in a dried coating amount of 5 g/m² and dried to provide a release sheet base material. The undercoat layer of this release sheet base material was coated with the same silicone release agent as used in Example 3 and dried to provide a release liner.

Adhesive sheet

Using the above release liner and the same face stock and adhesive as used in Example 1, an adhesive sheet was fabricated in the same manner as Example 1.

Comparison Example 2

Release liner

Using a bar coater, a wood-free paper, 50 g/m² and 65 μm thick, was coated with a styrene-maleic acid copolymer aqueous solution (tradename "Scripset 520", glass transition temperature 156° C., Monsanto Co., Ltd.) of 12% concentration in a dried coating amount of 5 g/m² and dried to provide a release sheet base material.

The undercoat layer side of this release sheet base material was coated with the same silicone release agent as used in Example 1 and dried to provide a release liner.

Adhesive sheet

Using the above release liner and the same-face stock and adhesive as used in Example 1, an adhesive sheet was fabricated in the same manner as Example 1.

Comparison Example 3

Release liner

A 1-liter four-necked flask fitted with a stirrer, condenser, dropping funnel, nitrogen gas inlet and thermometer was charged with 120 g of isopropyl alcohol and 56 g of water and the temperature was increased to the reflux temperature with stirring in a nitrogen stream.

Then, the dropping funnel was filled with 60 g of butyl acrylate, 30 g of acrylic acid, 10 g of acrylonitrile and 0.5 g of 2,2'-azobisisobutyronitrile and this homogeneous solution was added dropwise over a period of 2 hours. After completion of dropwise addition, the reaction system was aged for 2 hours. The polymerization reaction and aging were carried out at the reflux temperature. After aging, the contents of the flask were cooled to 40° C. and neutralized with aqueous sodium hydroxide solution. After this reaction, the temperature was increased for azeotropic removal of isopropyl alcohol and water. After cooling, the reaction mixture was diluted to 30% concentration to provide an aqueous copolymer dispersion (F). The glass transition temperature of this copolymer was −11° C.

An undercoat coating composition of 24% concentration was prepared using 80 parts (calculated as solids) of the above copolymer dispersion (F), 18 parts of oxidized starch (tradename "Ace C", Oji Cornstarch Co., Ltd.) and 2 parts of colloidal silica (tradename "Snowtex 30", Nissan Chemical Industries, Ltd.), and using a bar coater, a wood-free paper, 50 g/m² and 65 μm thick, was coated with the above coating composition in a dried coating amount of 7 g/m² followed by drying to provide a release sheet base material. This undercoat coating composition had poor drying property and caused a high incidence of break in the coating process resulting in very poor productivity.

The undercoat layer of the above release sheet base material was coated with a 9% toluene solution of silicone release agent (tradename KS-770, Shin-Etsu Chemical Co., Ltd., dynamic coefficient of friction 0.15) in a dried coating amount of 1.0 g/m² using a bar coater and dried to provide a release liner.

Adhesive sheet

Using the above release liner and the same face stock and adhesive as used in Example 1, an adhesive sheet was fabricated in the same manner as Example 1.

Comparison Example 4

Release liner

A reactor was charged with 2 g of anionic emulsifier (sodium lauryl sulfate, mol. wt.=272), 0.5 g of ammonium persulfate and 125 g of deionized water, and while the charge was maintained at a constant temperature of 75° C. with stirring, a mixture of 85 g of butyl acrylate, 7 g of methyl methacrylate, 5 g of acrylic acid and 3 g of β-hydroxyethyl methacrylate was added dropwise continuously over a period of 3 hours for polymerization. After completion of dropwise addition, the reaction mixture was aged at 75° C. for 3 hours to complete the reaction to thereby provide an aqueous copolymer dispersion (G). The glass transition temperature of this copolymer was −45° C. and the emulsifier content was 0.2%.

An undercoat coating composition of 25% concentration was prepared using 75 parts (calculated as solids) of the above copolymer dispersion (G) and 25 parts of oxidized starch (tradename "Ace A", Oji Corn-starch Co., Ltd.). This coating composition was unstable with a tendency of starch precipitating. Using a bar coater, a wood-free paper, 50 g/m² and 65 μm thick, was coated with the above coating composition in a dried coating amount of 5 g/m² followed by drying to provide a release sheet base material. This release sheet base material showed streaks on the coated surface.

Using a bar coater, the undercoat layer of this release sheet base material was coated with a 9% toluene solution of silicone release agent (tradename "SRX-211", Dow Corning Toray Silicone Co., Ltd., dynamic coefficient of friction 0.18) in a dried coating amount of 11 g/m² followed by drying, to provide a release liner.

Adhesive sheet

Using the above release liner and the same face stock and adhesive as used in Example 2, an adhesive sheet was fabricated in the same manner as Example 2.

The 16 different adhesive sheets fabricated as above were subjected to the following evaluations. The results are shown in Table 1 below.

Drying characteristic (ink let recording)

Using an ink jet recording device (Canoward α-50 manufactured by Canon Inc.), a predetermined pattern was recorded and the record was immediately rubbed with gauze to visually evaluate the degree of soiling due to spreading of the ink.

⊚: Not soiled at all o: Hardly soiled

Δ: Slightly soiled but-practically negligible x: Soiled

Recording density (ink let recording)

The above record was evaluated with a densitometer (Macbeth Corp., Model RD914).

Feathering on water-base ink writing

The evaluation was made according to J-TAPPI paper & pulp test method No. 12-76. The larger the value, the lower is the degree of feathering and the greater is the sharpness of lines.

Peel adhesion

The bond strength between the adhesive surface and a stainless steel plate was measured in accordance with JIS Z 1528. Thus, in a room controlled at 20° C. and 60% RH, the adhesive label (i.e., face stock+adhesive layer) of the adhesive sheet was bonded to the stainless steel plate by two reciprocations of a 2 kg roller and after an interval of 2 hours the label was peeled off at an angle of 180° with an Instron tensile tester using a peeling speed of 300 mm/min, and the corresponding load (g/25 mm) was measured.

Cutting property

The adhesive sheet samples, 20 cm long×15 cm wide, were provided. Then, 100 samples were piled and cut with a guillotine tester (tradename "CM-450", Rokugoh Mfg. Co., Ltd.) transversely in 20 consecutive runs. Then, the amount (mg) of the adhesive adhered to the guillotine knife was determined.

Tensile strength and elongation of the adhesive

The tensile strength and elongation of an adhesion film were measured in accordance with JIS K-6301.

Duplicating

Using a copying machine (tradename "SF-8100", Sharp Co., Ltd.), a predetermined pattern was copied. Immediately the record was abraded with a razor blade and the mode of obliteration of the record was visually evaluated.

o: The record is substantially not erased

Δ: The record is erased a little but to a practically negligible extent.

x: The record is erased.

Feeding property

Using a copying machine (tradename "SF-8100", Sharp Co., Ltd.), a predetermined pattern was copied. The ease of threading of the adhesive sheet was visually evaluated.

o: No jamming occurs.

Δ: Jamming occasionally occurs but to a practically negligible extent.

x: Jamming occurs frequently.

Curl

The test was performed at 20° C. and 60% RH in accordance with J. TAPPI paper & pulp test method No. 16-77 and the degree of curl was calculated by means of the following equation.

$$\text{Degree of curl} = (1/R) \times 100$$

where R is a radius of curl (cm). In Table 1, "+" means that the curl occurred in the direction of the face stock, and "−" means that the curl occurred in the direction of the release liner.

Dynamic coefficient of friction

The dynamic coefficient of friction between the release agent layer of the release liner and a chloroprene rubber (65°±2°/Shore A hardness) surface was measured according to JIS P-8147.

Release force

The release force of the adhesive label (face stock+ adhesive layer) from the surface of the release liner was measured at 20° C. and 60% RH in accordance with JIS Z-1538. Using an Instron tensile tester, the adhesive label of the sample adhesive sheet was peeled off from the release liner at an angle of 180° and a peeling speed of 300 mm/min. and the corresponding load (g/50 mm) was measured.

Further, the initial permeation rate of 50 wt. % aqueous diethylene glycol solution of the face stock and of the base paper, the glass transition temperature (Tg; ° C.) and toluene-insoluble gel fraction of the (meth)acrylate resin of the undercoat layer of the release liner were determined by the methods described above in the specification.

Overall evaluation is evaluated as follows.

◎: Extremely excellent o: Excellent

Δ: Partly insufficient but practically no problem x: Defective and not practically usable It will be apparent from Table 1 that the adhesive sheets obtained in the working examples of this invention have the advantages of no incidence of curl, good feeding and duplication properties excellent ink jet recording property and writing property, inhibited oozing of the adhesive in guillotine cutting and improved labeling property.

TABLE 1

| | Face stock | | Adhesive sheet | | | | |
| | Initial permeation rate (g/sec.)[1] | | Ink jet recording | | Water-base ink writing property | Peel adhesion (g/25 mm) | Adhesive agent | |
| | | | Drying | | | | Tensile | Elonga- |
| | Base paper | Face stock | characteristic | Density | | | strength (kg/cm²) | tion (%) |
| Example 1 | 6.0 | 3.0 | Δ | 1.20 | 3 | 1700 | 1.2 | 1800 |
| Example 2 | 6.0 | 4.6 | O | 1.32 | 6 | 1500 | 2.0 | 1500 |
| Example 3 | 6.0 | 4.6 | O | 1.32 | 6 | 1500 | 2.0 | 1500 |
| Example 4 | 6.0 | 5.2 | ◎ | 1.24 | 6 | 1600 | 2.0 | 1500 |
| Example 5 | 5.0 | 4.5 | O | 1.20 | 6 | 1000 | 1.5 | 2500 |

TABLE 1-continued

| | | | | | | | | |
|---|---|---|---|---|---|---|---|---|
| Example 6 | 4.5 | 4.0 | ○ | 1.22 | 6 | 1800 | 1.8 | 2500 |
| Example 7 | 5.0 | 4.8 | ○ | 1.20 | 6 | 1200 | 1.5 | 2500 |
| Example 8 | 6.0 | 3.0 | Δ | 1.20 | 3 | 1700 | 1.2 | 1800 |
| Example 9 | 6.0 | 4.6 | ○ | 1.32 | 6 | 1500 | 2.0 | 1500 |
| Example 10 | 6.0 | 4.6 | ○ | 1.32 | 6 | 1500 | 2.0 | 1500 |
| Example 11 | 6.0 | 5.2 | ⊙ | 1.24 | 6 | 1600 | 2.0 | 1500 |
| Example 12 | 6.0 | 5.2 | ⊙ | 1.24 | 6 | 1600 | 2.0 | 1500 |
| Comparison Example 1 | 6.0 | 3.0 | Δ | 1.20 | 3 | 1700 | 1.2 | 1800 |
| Comparison Example 2 | 6.0 | 3.0 | Δ | 1.20 | 3 | 1700 | 1.2 | 1800 |
| Comparison Example 3 | 6.0 | 3.0 | Δ | 1.20 | 3 | 1700 | 1.2 | 1800 |
| Comparison Example 4 | 6.0 | 4.6 | ○ | 1.32 | 6 | 1500 | 2.0 | 1500 |

| | Adhesive sheet | | | | Release liner | | | | | |
|---|---|---|---|---|---|---|---|---|---|---|
| | Duplicating property | Feeding property | Cutting property (mg) | curl | Undercoat (meth)acrylate resin Glass transition temperature (°C.) | Gel fraction (%)[2] | Emulsifier (%)[3] | Dynamic coefficient of friction | Release force (g/50 mm) | Overall evaluation |
| Example 1 | Δ | Δ | 50 | +5 | 4 | 80 | 3.0 | 0.27 | 30 | Δ |
| Example 2 | ○ | ○ | 20 | +3 | 4 | 80 | 3.0 | 0.27 | 25 | ○ |
| Example 3 | ○ | ○ | 15 | +2 | −11 | 94 | 2.5 | 0.21 | 15 | ○ |
| Example 4 | ○ | ○ | 16 | +3 | 4 | 80 | 3.0 | 0.27 | 25 | ⊙ |
| Example 5 | ○ | ○ | 5 | +5 | −11 | 94 | 2.5 | 0.21 | 30 | ○ |
| Example 6 | ○ | ○ | 25 | +5 | −11 | 94 | 2.5 | 0.25 | 25 | ○ |
| Example 7 | ○ | ○ | 10 | +3 | −11 | 94 | 2.5 | 0.21 | 35 | ○ |
| Example 8 | Δ | Δ | 45 | +5 | 4 | 80 | 3.0 | 0.27 | 25 | Δ |
| Example 9 | ○ | ○ | 20 | +4 | 4 | 80 | 3.0 | 0.27 | 20 | ○ |
| Example 10 | ○ | ○ | 20 | −3 | 4 | 80 | 3.0 | 0.27 | 25 | ○ |
| Example 11 | ○ | Δ | 5 | +15 | 16 | 88 | 4.5 | 0.27 | 20 | Δ |
| Example 12 | ○ | ○ | 5 | −3 | −21 | 85 | 3.0 | 0.27 | 25 | ⊙ |
| Comparison Example 1 | Δ | ○ | 100 | −5 | −21 | 50 | 3.0 | 0.21 | 100 | X |
| Comparison Example 2 | Δ | X | 100 | +42 | 156 | 45 | — | 0.27 | 120 | X |
| Comparison Example 3 | Δ | X | 300 | −5 | −11 | 75 | — | 0.15 | 100 | X |
| Comparison Example 4 | ○ | ○ | 50 | −10 | −45 | 85 | 0.2 | 0.18 | 100 | X |

Note [1] Initial permeation rate of 50 wt. % aqueous solution of diethylene glycol
Note [2] Toluene-insoluble gel fraction
[3] Proportion of emulsifier to total monomer

What is claimed is:

1. A pressure sensitive adhesive sheet for non-impact printing comprising a base sheet, an undercoat layer formed on said base sheet, a release agent layer formed on said undercoat layer, a pressure sensitive adhesive layer formed on said release agent layer and a face stock disposed on said pressure sensitive adhesive layer, wherein said undercoat layer comprises (a) a copolymer obtained by emulsion-copolymerizing at least one hydroxyl group-containing (meth)acrylic acid ester with at least one of other vinyl monomers copolymerizable therewith and (b) a pigment, Wherein the proportion of the hydroxyl group containing (meth)acrylic acid ester based on the total monomers in the copolymer is about 0.5–30 weight % and the proportion of said other vinyl monomers copolymerizable therewith based on the total monomers in the copolymer is 70–99.5 weight %, wherein the copolymer is at least 55 weight in toluene-insoluble gel fraction, wherein the proportion of the pigment is within the range of about 50–150 parts by weight per 100 parts by weight of the copolymer, and wherein the pressure sensitive adhesive layer is present in an amount of about 5–50 g/m$^2$ on a dry basis.

2. The pressure sensitive adhesive sheet according to claim 1 wherein said face stock comprises (i) a base paper composed of a paper stock comprising at least one member selected from the group consisting of chemical pulps, mechanical pulps and secondary stock pulps and (ii) a coating layer formed on said base paper, said coating layer containing a resin comprising a cationic resin as a main component and a cationic surface size as an auxiliary agent.

3. The pressure sensitive adhesive sheet according to claim 1 wherein said pressure sensitive adhesive layer contains a pressure sensitive adhesive obtained by a two-stage polymerization comprising a first stage and a second stage, wherein in the first stage an emulsion of a (meth)acrylic acid ester-based seed polymer having an average particle size of about 0.15–0.35 μm is prepared and in the second stage a pre-emulsion comprising a (meth)acrylic acid ester-based monomer mixture, a tackifier, an emulsifier and water is added to said emulsion and then emulsion polymerization is conducted until about 300–3000 parts by weight, on a nonvolatile basis, of a polymer is obtained per 100 parts by weight of the polymer prepared in said first stage.

4. The pressure sensitive adhesive sheet according to claim 1 wherein said pressure sensitive adhesive layer contains an adhesive having a tensile strength of about 0.5–2.0 kg/cm$^2$ as determined according to JIS K6301 and an elongation of about 1500–3000% as determined according to JIS K6301.

5. The pressure sensitive adhesive sheet according to claim 1 wherein said copolymer contains about 2–6 weight %, on a nonvolatile basis, of an emulsifier relative to the total monomer constituting the copolymer.

6. The pressure sensitive adhesive sheet according to claim 1 wherein said copolymer has a glass transition temperature of about −30° C. to +20° C.

7. The pressure sensitive adhesive sheet of according to claim 2 wherein the base paper constituting said face stock is at least 3.5 g/sec in initial permeation rate of a 50 weight % aqueous solution of diethylene glycol.

8. The pressure sensitive adhesive sheet according to claim 1 wherein said face stock is 3.0 to 7.0 g/sec in initial permeation rate of a 50 weight % aqueous solution of diethylene glycol.

9. The pressure sensitive adhesive sheet according to claim 2 wherein the coating amount of the coating layer is about 0.2 to 13 g/m$^2$ on a dry weight basis.

10. The pressure sensitive adhesive sheet according to claim 2 wherein the coating layer contains said cationic size in an amount of about 0.01 to 70 parts by weight per 100 parts by weight of the cationic resin.

11. The pressure sensitive adhesive sheet according to claim 9 wherein the coating layer contains said cationic size in an amount of about 0.01 to 70 parts by weight per 100 parts by weight of the cationic resin.

12. The pressure sensitive adhesive sheet according to claim 2 wherein the said base paper further contains at least one member selected from the group consisting of non-wood pulp, synthetic fibers and glass fibers.

* * * * *